United States Patent
Belloir et al.

(10) Patent No.: US 10,429,706 B2
(45) Date of Patent: Oct. 1, 2019

(54) ELECTRO-OPTICAL DEVICE FOR DETECTING LOCAL CHANGE IN AN ELECTRIC FIELD

(71) Applicants: Centre National de la Recherche Scientifique (CNRS), Paris (FR); Universite Grenoble Alpes, Saint-Martin-d'heres (FR)

(72) Inventors: Tiphaine Belloir, Grenoble (FR); Olivier Lecarme, Grenoble (FR); Thibault Honegger, Grenoble (FR)

(73) Assignees: Centre National de la Recherche Scientifique (CNRS), Paris (FR); Universite Grenoble Alpes, Saint-Martin-d'heres (FR)

( * ) Notice: Subject to any disclaimer, the term of this patent is extended or adjusted under 35 U.S.C. 154(b) by 0 days.

(21) Appl. No.: 16/065,267

(22) PCT Filed: Dec. 16, 2016

(86) PCT No.: PCT/FR2016/053493
§ 371 (c)(1),
(2) Date: Jun. 22, 2018

(87) PCT Pub. No.: WO2017/109346
PCT Pub. Date: Jun. 29, 2017

(65) Prior Publication Data
US 2018/0373083 A1    Dec. 27, 2018

(30) Foreign Application Priority Data
Dec. 22, 2015    (FR) ...................................... 15 63144

(51) Int. Cl.
*G02F 1/1343*    (2006.01)
*B82Y 15/00*    (2011.01)

(52) U.S. Cl.
CPC .... *G02F 1/13439* (2013.01); *G02F 1/134309* (2013.01); *B82Y 15/00* (2013.01); *G02F 2001/134318* (2013.01); *G02F 2201/122* (2013.01)

(58) Field of Classification Search
None
See application file for complete search history.

(56) References Cited

U.S. PATENT DOCUMENTS

2014/0022465 A1    1/2014  Wu
2018/0304258 A1*  10/2018  Honegger ......... B01L 3/502776

* cited by examiner

*Primary Examiner* — Phu Vu
(74) *Attorney, Agent, or Firm* — Banner & Witcoff, Ltd.

(57) ABSTRACT

The invention relates to an electro-optical device for detecting an electric field emitted locally by a sample (100), comprising an upper (20) and a lower (21) polarizer, an active layer of liquid crystals (30) of variable polarization included between an upper (50) and a lower (51) alignment layer, having two perpendicular directions of alignment, and an upper (60) and lower (61) electrode liable to be connected to an AC voltage source (70) such that when a voltage difference (Vext) is applied, the layer of liquid crystals is immersed in the electric field formed between the two electrodes. It is essentially characterized in that it comprises a layer of anisotropic electrical conductors (40) in contact with the upper alignment layer or separated therefrom by the upper polarizer, the conductors being configured to transmit said electric field in only one direction secant to the alignment layers.

10 Claims, 3 Drawing Sheets

ELECTRO-OPTICAL DEVICE FOR DETECTING LOCAL CHANGE IN AN ELECTRIC FIELD

RELATED APPLICATION DATA

This application is a National Stage Application under 35 U.S.C. 371 of co-pending PCT application number PCT/FR2016/053493 designating the United States and filed Dec. 16, 2016; which claims the benefit of FR application number 1563144 and filed Dec. 22, 2015 each of which are hereby incorporated by reference in their entireties.

FIELD OF THE INVENTION

The present invention relates to the field of optical detection by using an electro-optical device comprising a liquid crystal layer having active variable polarisation.

"Having active variable polarisation" means any type of liquid crystals enabling, for an incident beam polarised linearly on input of the liquid crystal layer, the polarisation direction of said incident beam to be varied at output of said liquid crystal layer depending on the presence or absence of an electrical field applied to said liquid crystal layer.

Liquid crystals having active variable polarisation are for example liquid crystals in twisted nematic configuration, hereinbelow abbreviated as TN configuration; liquid crystals having vertical alignment, or again in-plane switching.

In TN configuration:
polarisation of said incident beam at output of said liquid crystal layer is perpendicular to the polarisation of said incident beam at input of said liquid crystal layer when they are not subjected to any electrical field; and
polarisation of said incident beam at output of said liquid crystal layer is parallel to the polarisation of said incident beam at input of said liquid crystal layer when they are subjected to an electrical field; and With liquid crystals having vertical alignment, or in-plane switching:
polarisation of said incident beam at output of said liquid crystal layer is parallel to the polarisation of said incident beam at input of said liquid crystal layer when they are not subjected to any electrical field; and
polarisation of said incident beam at output of said liquid crystal layer is perpendicular to the polarisation of said incident beam at input of said liquid crystal layer when they are subjected to an electrical field.

Linear and rectilinear polarisation are understood to be interchangeable. Preferably, the axis of polarisation of rectilinear polarisation is parallel to the plane of the alignment layers described later.

The use of liquid crystals in TN configuration is known, for example for some display screens.

In TN configuration, liquid crystals are confined in a thin layer between two alignment layers. Each alignment layer comprises an alignment direction in the plane of the layer. The liquid crystals near the layer have a director, that is, an average alignment direction of the liquid crystals, parallel to the alignment direction. The two alignment layers are arranged such that their alignment directions are perpendicular. In this way, between the two alignment layers the liquid crystals have a twisted director which turns gradually from one layer to the other.

When a difference in potential is applied between the two alignment layers, the liquid crystals are no longer twisted but parallel to each other and parallel to the resulting electrical field.

This effect is used for example for some liquid crystal displays (LCD), where each alignment layer is coupled to a rectilinear polariser, such that the two polarisers are crossed; in combination with a mirror this can reflect incident light or not (https://fr.wikipedia.org/wiki/Twisted_nematic).

Quite an astute evolution of liquid crystals in TN configuration is being proposed here, in particular for observation of the activity of neurons.

To date there are different observation techniques of neurons, including electrophysiological recording techniques of ionic currents transiting through cellular membranes, better known as patch-clamp. These techniques allow very good resolution but on a scale of one or a few neurons at a maximum. However, the amount of neurons observed simultaneously is restricted and these techniques also have an invasive character.

There are also networks of micro-electrodes or MEA, which allow direct measuring of the potential near cells by electrodes. But MEA have no resolution in the region of an individual neuron and have a relatively high noise-to-signal ratio. Also, to date, the maximal number of electrodes per MEA is from 1 to 3000, which also limits the total number of neurons which can be observed.

Finally, neuronal activity marking techniques and fluorescence visualisation (fluorescent imagery of calcic activity or genetic modification of ionic channels whereof the activation can be made fluorescent) are also known, which track neuronal activity on a scale of a single neuron by fluorescent probe. However, these techniques do not have a very wide field of observation and also have an invasive character.

The present invention resolves these problems.

SUMMARY OF THE INVENTION

More precisely, the invention relates to an electro-optical device for detection of an electrical field generated locally by a sample (100), the device comprising:
An alternative power source (70);
A linear upper polariser (20) and a linear lower polariser (21);
A liquid crystal layer (30), between an upper alignment layer (50) and a lower alignment layer (51) having two alignment directions perpendicular to each other;
An upper electrode (60) and a lower electrode (61), connected electrically to the alternative power source (70), and arranged such that when a difference in voltage (Vext) is applied between said electrodes by said alternative power source, an electrical field is created between the two electrodes, the liquid crystal layer immersing in said electrical field;
A layer of anisotropic electrical conductors (40), arranged between the electrodes (60, 61).
It is essentially characterized in that it also comprises:
said sample (100) immersing in said electrical field created between the two electrodes;
a light source (10) configured to emit an incident beam (90) in monochromatic light in the direction of an optical sensor (80), by transmission or reflection of said incident beam through the liquid crystal layer (30);
and characterized in that:
said liquid crystal layer (30) has active variable polarisation,
the layer of anisotropic electrical conductors (40) is configured to send said electrical field created between the two electrodes in a single direction of propagation secant to the alignment layers;

said layer of anisotropic electrical conductors being arranged in contact with the upper alignment layer or separated from the latter by the upper polariser.

In an embodiment, said sample (100) has no contact with said upper electrode (60) and said lower electrode (61).

In an embodiment, the upper polariser and the lower polariser have parallel axes of polarisation, which produces a signal according to a first contrast, in this case white on black background, at output of the optical sensor described later.

In an embodiment, the upper polariser and the lower polariser present perpendicular axes of polarisation, which produces a signal according to a second contrast reversed relative to the first contrast, in this case black on white background, at output of the optical sensor described later.

In an embodiment, said upper electrode (60) and said lower electrode (61) are arranged such that when the external voltage (Vext) is applied from said alternative power source (70): said sample (100), said layer of anisotropic electrical conductors (40) and said liquid crystal layer (30) are subjected to some at least of the field lines connecting the two electrodes, the electrical field generated locally by said sample (100) disrupting said electrical field created between the two electrodes.

In an embodiment, said sample (100) comprises a biological neuron network.

In an embodiment, called "transmission", the upper polariser (20) and the lower polariser (21) present axes of polarisation parallel or perpendicular to each other depending on the preferred contrast; they are spatially arranged on either side of the liquid crystal layer (30) and present a spatial configuration in which they are preferably parallel to each other.

In an embodiment, called "reflection", the upper polariser (20) and the lower polariser (21) are perpendicular to each other; the upper polariser being arranged between the upper alignment layer (50) and the layer of anisotropic electrical conductors (40), the device also comprising a beam separator (120) configured to direct an incident beam (90) coming from a light source and passing through the lower polariser (21) towards the liquid crystal layer (30) by passing successively, from the lower polariser (21), through the beam separator (120), then the liquid crystals (30) and, after reflection on the layer of anisotropic electrical conductors (40), again passes through the liquid crystal layer (30), optionally the beam separator (120), and an optical sensor (80), without passing through the lower polariser (21).

In an embodiment, the device also comprises an optical sensor (80), configured to detect the optical beam (90) of a light source (10) after transmission or reflection of said optical beam through the liquid crystal layer (30).

The external voltage (Vext) is greater than 0V and lower than the breakdown voltage of liquid crystals, and preferably lower than the voltage of saturation of liquid crystals; or the electrical field generated by the external voltage is greater than 0 V/m and lower than $10^4$ V/m.

In an embodiment, the liquid crystals (30) are liquid crystals PCH5 nematic at 37° C. and the external voltage (Vext) is greater than 0V and lower than 10 V; in this case it is between 2V and 5V.

In an embodiment, the device also comprises a memory and a programmable computer comprising program code instructions for:

recording in said memory:
an inactive initial image corresponding to the optical response of the liquid crystals (30) when said sample (100) emits no electrical field;
an active image corresponding to the optical response of the liquid crystals (30) when said sample (100) emits an electrical field locally; and for
calculating the difference between the inactive initial image and the active image.

Because of the invention, it is possible to observe neurons on an individual scale on one to a few pixels, without contact (non-invasive), without chemical marking, over several weeks and over a field of observation greater than one hundred $cm^2$.

Because of the invention, it is possible to have the amount of light transmitted varied by controlling the intensity of the electrical field applied to the liquid crystals.

Other characteristics and advantages of the present invention will emerge more clearly from the following description given by way of illustrative and non-limitative example and done in reference to the appended figures.

DETAILED DESCRIPTION

The invention optically detects the electrical activity of a sample 100. Sample means any sample, biological in particular, likely to generate or locally modify an electrical field. For brevity, only one sample in the form of network of neurons, monolayer or multilayer will be described here. The invention can be executed for other samples, for example axons (nerves), slices of tissue (slices of brain for example) or whole tissue (brain), biological cells having ionic transmembranal exchanges, especially in immunology.

The sample is deposited on or in a sample support 110, in this case a micro-fluidic cell.

As described hereinbelow, the invention comprises an array of elements of the same type or same composition, for example alignment layers, polarisers or electrodes. By convention, for any array of elements of the same type or same composition, "upper" or "proximal" means the element of said assembly closest to said sample, and by "lower" or "distal" means the element farthest from said sample.

"Transparent" means transparent to the central wavelength of the incident beam emitted by a light source.

In an embodiment, called "transmission", along its optical path an incident beam passes through said sample before traversing the liquid crystals. This embodiment especially enables observation of the activity of a network of neurons, in particular in vitro.

In an embodiment, called "reflection", along its optical path the incident beam passes through the liquid crystals before said sample, which allows observation of the activity of a network of neurons in particular in vivo.

In the "transmission" mode, said sample is at least partially transparent.

The optical path is defined by the trajectory of the incident beam whereof the origin is the light source and the destination is the optical sensor.

Light Source

A light source 10, preferably homogeneous, configured to emit an incident beam 90 is provided.

In the "transmission" mode, the incident beam is sent preferably directly in the direction of liquid crystals described hereinbelow. In the "reflection" mode, the incident beam is sent indirectly in the direction of liquid crystals, that is, the latter passes through a separator described later.

The spectrum emitted by the light source can be polychromatic. Preferably though, a monochromatic source or a white source will be used, and an array of at least one monochromatic filter, advantageously whereof the wavelength is centred on the wavelength for which optical transmission of liquid crystals is optimal for the given thickness of liquid crystals. Tests were conducted by the applicant with a monochromatic source centred at 550 nm.

It is expected that the light source is activated at least for each image taken, that is, the image obtained by the optical sensor described later at a given moment.

Preferably, light emitted by the light source is non-polarised, or polarised in a direction parallel to the axis of polarisation of the first polariser met by the beam on the optical path (upper polariser in the "transmission" embodiment and lower polariser in the "reflection" embodiment), polarisers also described later.

Liquid Crystals

A liquid crystal layer 30 having active variable polarisation is provided, preferably in the form of a thin layer, in particular whereof the thickness is between 100 nm and 100 µm and in this case 4.5 µm.

Preferably, said liquid crystals are in TN configuration. For example, liquid crystals PCH5 nematic at 37° C. are provided.

The thickness of the liquid crystal layer is controlled so as to ensure the variation in polarisation of the incident beam of 90° under the influence of an electrical field on said liquid crystals.

The response time of liquid crystals is of the order of a micro-second, which allows alignment of the latter, therefore observation almost in real time.

Alignment Layers

The liquid crystals are contained between two alignment layers, that is, an upper alignment layer 50 and a lower alignment layer 51, and in contact with the latter.

The alignment layers are nanostructured for example by lithography called "nanoimprint" photolithography or similar. They are flat (ready for nano-patterning) and parallel to each other, and have a thickness of preferably lower than 1 mm. For example, they are constituted by methyl polymethacrylate (PMMA) or polyimide.

For their nanostructuring, each alignment layer comprises an array of grooves, in this case of transversal rectangular cross-section, rectilinear, parallel and equidistant in pairs, and formed for example by moulding. The alignment direction of each alignment layer is defined by the direction of elongation of the grooves. In other embodiments, the transversal cross-section is other than rectangular, sinusoidal for example.

The two alignment layers each present a respective alignment direction.

In contact with an alignment layer, the liquid crystals are aligned in the alignment direction.

The two alignment directions are perpendicular to each other; at rest, this produces liquid crystals in TN configuration.

The liquid crystals are held between the two alignment layers by spacers, for example by transparent microballs of SiO2, micro-nanostructured pillars made of polymer or glass, etc., deposited for example by spincoating and solvent evaporation or other equivalent technique, the thickness of the liquid crystal layer being controlled by the height of the spacers.

Tests were conducted with each alignment layer made of PMMA having a thickness of around 100 nm, each groove having a transversal cross-section of 250 nm*170 nm and two adjacent grooves being separated by 250 nm, and transparent microballs of SiO2 of 4.5 µm diameter.

In an embodiment, the thickness of each alignment layer is between 100 nm and 200 nm.

The incident beam is secant to the alignment layers. Preferably, the incident beam is substantially perpendicular to the alignment layers.

First and second alignment layer respectively mean the first alignment layer and the second alignment layer arranged on the optical path.

In the "transmission" embodiment, the first alignment layer is the upper alignment layer.

In the "reflection" embodiment, the first alignment layer is the lower alignment layer.

The liquid crystals can modify polarisation of light. At rest, there is therefore advantageously the alignment direction of the first alignment layer parallel to the polarisation direction of the first polariser put on the optical path (upper polariser in the "transmission" embodiment and lower polariser in the "reflection" embodiment), the polarisers being described later.

The liquid crystal layer encapsulated between the alignment layers is called cell.

Layer of Anisotropic Electrical Conductors

Figure 5:
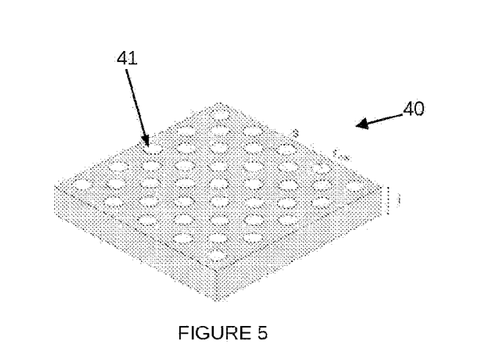
FIG. 5 illustrates an embodiment of a layer of anisotropic electrical conductors according to the invention.

A layer of anisotropic electrical conductors 40 is also provided, preferably flat, of constant thickness and parallel to the alignment layers, for example in the form of a membrane an example of which is illustrated in FIG. 5.

The layer of anisotropic electrical conductors 40 allows optical transmission of the incident beam. Preferably, it is at the wavelength of the incident beam.

"Anisotropic" means what allows transmission of field lines in a single direction of propagation only. When subjected to an electrical field, only the component of said electrical field parallel to said direction of propagation is transmitted through the layer of anisotropic electrical conductors.

In an embodiment, the layer of anisotropic electrical conductors is an electrically insulating matrix, pierced by through holes which are filled with an electrical conductor. The layer 40 comprises an array of individual anisotropic electrical conductors 41.

It is expected that the direction of propagation of each anisotropic electrical conductor 41 is secant, and preferably perpendicular to the alignment layers. Preferably, it is expected that the direction of propagation of each anisotropic electrical conductor is linear and exhibits an angle of at most 45° relative to the perpendicular to the alignment layers.

For example, the layer of anisotropic electrical conductors is a matrix of Al2O3 or of polycarbonate, pierced with holes filled with poly(3,4-ethylenedioxythiophene), a polymer better known by the acronym PEDOT, which is conductive and transparent. The axis of orientation of a through hole defines the anisotropy axis of the corresponding electrical conductor.

In reference to FIG. 5, with:
S the shortest distance separating two adjacent holes,
$r_{nw}$ the radius of a through hole, and
I the thickness of the layer of anisotropic electrical conductors,
optical transmission of the device according to the invention can be optimised by selecting the value of $r_{nw}$ depending on I, S and the electrical conductivity of the material of the anisotropic electrical conductors.

Preferably, the number of anisotropic electrical conductors 41 per unit of surface of the layer 40 is lower than or equal to the number of pixels per unit of surface of the optical sensor 80.

Alternatively, the layer of anisotropic electrical conductors can be a matrix of nanowires encapsulated in an insulator (polycarbonate or SiO2 or other), such that it may be expected for the direction of propagation of each anisotropic electrical conductor 41 to have a helical form.

In an embodiment, the layer of anisotropic electrical conductors is a semi-conductor with a large gap or an electrical insulator, for example made of material comprising all or part of one of SiO2, Si3N4, SiN, plastic material (PMMA, PC, PET . . . ), insulating polymer (pyralene, PDMS). SiN advantageously has good mechanical strength.

Figure 6:
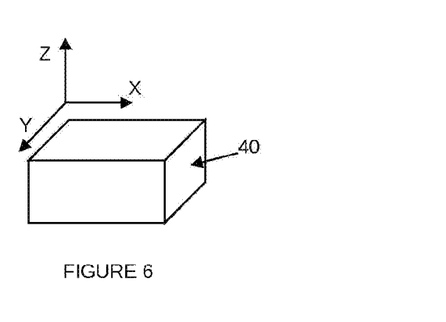
FIG. 6 illustrates a layer of anisotropic electrical conductors in three dimensions.

FIG. 6 illustrates a layer of anisotropic electrical conductors 40 in three dimensions in which the axis Z is parallel to the field lines of the electrical field created between the two electrodes and perpendicular to the plane XY.

In this case, the single direction of propagation is the direction according to the axis Z.

In fact, according to the axis X or according to the axis Y, the layer 40 has dimensions such that any field lines of the electrical field created between the two electrodes are totally attenuated according to the axis X and the axis Y respectively. In this way, the layer of anisotropic electrical conductors is an electrical insulator according to each of the directions X and Y.

According to the axis Z, the layer of anisotropic electrical conductors has a dimension (thickness) such that the field lines of the electrical field created between the two electrodes are transmitted at least partially. In this way, even if the material used for the layer 40 is reputed be an electrical insulator, a sufficiently fine thickness of this material all the same allows attenuated transmission of the electrical field. Earlier tests for example determine the thickness of the layer of anisotropic electrical conductors to be selected as a function especially of the chemical composition of the latter and of the intensity of the electrical field.

In this case, a layer thickness of anisotropic electrical conductors is selected such that the value of the electrical field transmitted according to the axis Z is greater than or equal to a predetermined percentage of the value of the electrical field created between the two electrodes.

Figure 7:
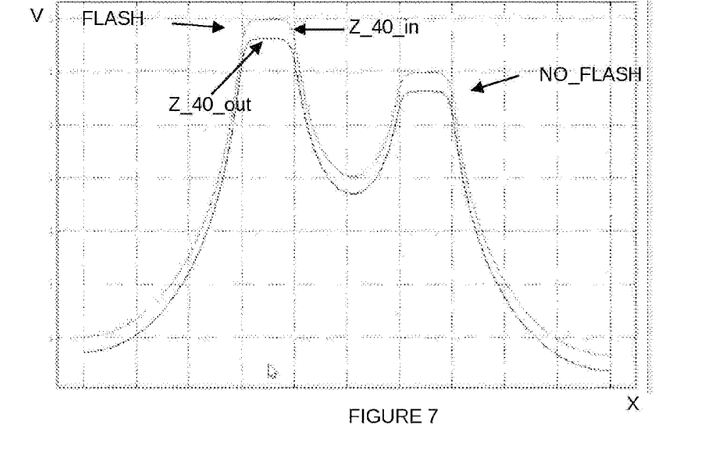
FIG. 7 illustrates the spatial distribution of the potential electrical seen by the liquid crystals for a sample comprising an active neuron and an inactive neurone.

FIG. 7 illustrates the electrical response (in Volts) depending on the direction X of a layer of anisotropic electrical conductors 40 on either side of said layer, in this case relative to a sample comprising two neurons.

Figure 4A:
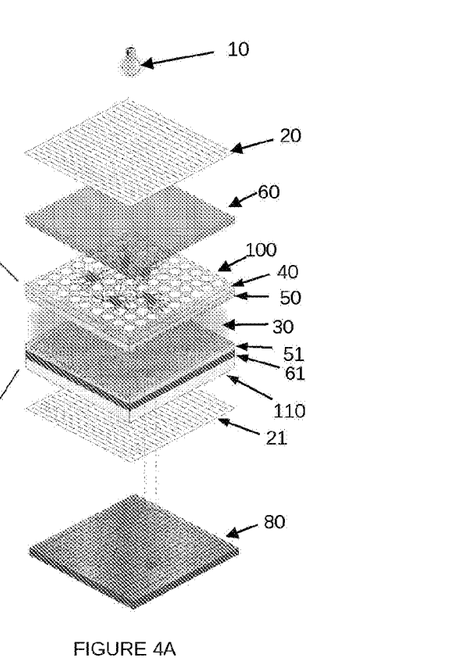
FIG. 4A illustrates an embodiment of the device according to the invention in "transmission" configuration.
Figure 4B:
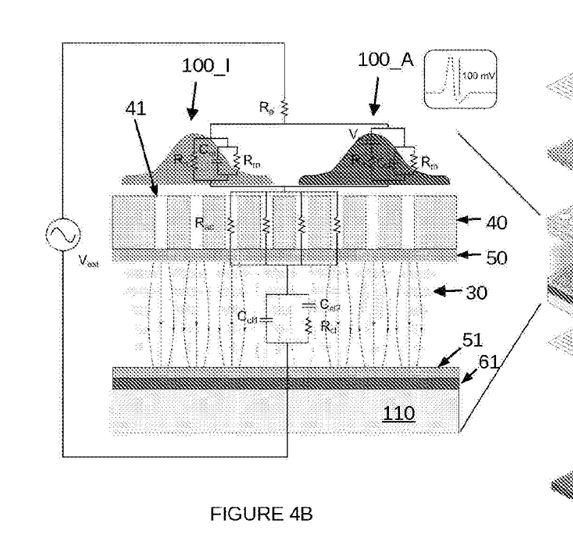
FIG. 4B illustrates an enlargement of a part of FIG. 4A.

The second peak corresponds to an inactive neuron NO_FLASH and the first peak to an active neuron FLASH. The upper curve Z_40_in represents the evolution of the electrical potential for the face of the layer 40 on the side of the neurons (linked to FIG. 4B), and the lower curve Z_40_out represents the evolution of the electrical potential for the face of the layer 40 of the side opposite the neurons, that is, on the side of the liquid crystals (linked to FIG. 4B).

The difference between the upper curve Z_40_in and lower curve Z_40_out illustrates the attenuation of the electrical field by the layer 40. The attenuation depends on the type of the layer 40 but not on the activity or the inactivity of the sample.

The layer of anisotropic electrical conductors is arranged between the sample and the upper alignment layer, and for example in contact with the latter.

In the "transmission" embodiment, the layer of anisotropic electrical conductors is preferably transparent.

In the "reflection" embodiment, the layer of anisotropic electrical conductors is preferably reflective.

In the "reflection" embodiment, the layer of anisotropic electrical conductors comprises advantageously electrically conducting nanowires, in this case pure or advantageously doped silicon, encapsulated in an electrically non-conducting membrane, in this case made of polycarbonate, the direction of the nanowires defining the anisotropy axis of the conductor. Alternatively, a membrane of alumina pierced with through holes and filled with PEDOT, with the axis of orientation of the through holes defining the anisotropy axis of the conductor. In this case, the polycarbonate or alumina membrane is advantageously reflective. A membrane made of anisotropic nanoporous silicon can also be provided.

The chemical composition of the reflective membrane influences the optical contrast.

Preferably, the direction of propagation of the anisotropic electrical conductor is perpendicular to the plane of the optical sensor described later, which prevents offsets of the image obtained on said optical sensor.

The layer of anisotropic electrical conductors ensures a bijective relation between the position of an element of the sample generating local modification of an electrical field and the position of the individual receptor or receptors of the optical sensor (pixels, photodiode(s)) detecting this modification.

Sample Base

Preferably, at least one sample base 110 is also provided, preferably flat, rigid or supple, parallel to the alignment layers and electrically non-conducting, in this case a glass plaque (or other type of preferably biocompatible support), which mechanically supports the structure of the device.

For example, a lower support is provided, in contact with the lower electrode described hereinbelow. An upper support can also be provided, for example in contact with the electrolyte described later.

Electrodes

A pair of electrodes can also be provided, that is, an upper electrode 60 and a lower electrode 61, such that when voltage is applied between these two electrodes, an electrical field is created between the two electrodes, preferably uniform, in which the liquid crystal layer is immersed.

The two electrodes can be identical. Preferably, the two electrodes are highly conductive, that is, exhibiting conductivity greater than 1 ohm/m at ambient temperature. For example, the electrodes are made of indium tin oxide (ITO).

The electrodes can be flat and parallel to the alignment layers and are preferably transparent.

For example, the lower electrode is in contact of the lower alignment layer.

Irrespective of the embodiment, the electrodes are arranged such that when the external voltage Vext is applied from an external alternative power source 70, the sample, the layer of anisotropic electrical conductors and the liquid crystals are subjected to some at least of the field lines connecting the two electrodes.

In the "transmission" embodiment, the upper electrode is preferably arranged between the liquid crystals and the light source, more particularly between the sample and the light source, and the lower electrode is arranged for example between the lower alignment layer and the support. The upper electrode can be arranged before or after the upper polariser along the optical path.

Preferably the sample and the upper electrode bathe in the same conductive medium, in this case a liquid electrolyte. The liquid electrolyte is a saline solution composed of ions in solution. For example, a cellular culture medium is provided, in this case Neurobasal (registered trademark).

In an embodiment, the upper electrode is at a distance of around 1 cm from the layer of anisotropic electrical conductors.

The electrodes are connected to an alternative power source. Preferably, the voltage generated at the terminals of the power source, called "external voltage" Vext, depends on the type of the liquid crystals. In this case, for liquid crystals PCH5 nematic at 37° C., the voltage generated at the terminals of the power source is between 2V and 5V.

The external voltage aligns the liquid crystals and modifies polarisation of the incident beam so as to allow the passage of said incident beam through the liquid crystal layer.

Also, the choice of value of the external voltage Vext optimises, or even guarantees, detection of the transmittance distance due to local modification of electrical field, as specified in the "operation" part.

Polarisers

At least two polarisers are also provided, that is, an upper polariser 20 and a lower polariser 21, preferably flat, optionally soft, and whereof at least the a is perpendicular to the direction of propagation of the incident beam.

The upper polariser and the lower polariser are rectilinear polarisers, that is, they produce polarised light rectilinearly according to their axis of polarisation.

In the "transmission" embodiment and as opposed to some displays LCD mentioned at the start of the description, the axes of polarisation of the upper polariser and of the lower polariser are here parallel to each other to produce a first contrast, and perpendicular to each other to produce a second contrast, reversed relative to the first contrast.

One at least of the polarisers has an axis of polarisation parallel to the alignment direction of one of the alignment layers.

In this case, the upper polariser has an axis of polarisation parallel to the alignment direction of the upper alignment layer, and the lower polariser has an axis of polarisation perpendicular to the alignment direction of the lower alignment layer.

The lower polariser is arranged between the liquid crystal layer and the optical sensor described hereinbelow, and preferably between the lower support and said optical sensor.

The upper polariser is arranged between the liquid crystal layer and the light source; and preferably between the upper support or the electrolyte and said light source.

First and second polariser respectively mean the first polariser and the second polariser arranged on the optical path.

In the "transmission" embodiment, the first polariser is the upper polariser.

In the "reflection" embodiment, the first polariser is the lower polariser.

In the "reflection" embodiment, it is expected that the upper polariser is arranged between the upper alignment layer and the layer of anisotropic electrical conductors, on which light is reflected without modification of polarisation (for example by way of silicon 1,0,0) and the lower polariser is preferably perpendicular to the upper polariser. The lower polariser can also be parallel to the upper polariser, though this involves a loss in light intensity.

In the "reflection" embodiment, a beam separator 120 is also provided, in this case a beam splitter, in this case at 45°, or a prism, arranged between the lower polariser and the liquid crystals, such that the incident beam passes through the lower polariser, then the beam splitter, then the liquid crystals and, after reflection, again passes through the beam splitter in the direction of the optical sensor, without passing through the lower polariser.

Preferably, the polarisers are flat and perpendicular to the direction of propagation of the incident beam.

Optical Sensor

An optical sensor 80, preferably in a matrix form, flat and parallel to the alignment layers, and typically a CMOS, CCD sensor or other array of at least one photodiode is provided. A microscope lens coupled or not to a CMOS, CCD sensor or at least one photodiode can also be provided. In this case, the focal point is advantageously located in the liquid crystal layer.

Preferably, a standard sensor is provided, for example as found on digital photo equipment, and for example of 16 million pixels, where each pixel is 4 μm*4 μm. In this case, as the activity of a neuron is distributed over 1 to 4 pixels, there can be a field of observation of 1 to 4 million neurons on a total surface of $256\ 10^{\hat{}}6\ \mu m^2$.

Neuron Network—Electrolyte

A biological neuron network can be provided as a sample 100, for example within a microfluidic cell, typically made of polydimetilsiloxane (PDMS) or polycarbonate, immersed in an electrolyte bath, typically a cellular culture medium.

In the "transmission" embodiment, the neuron network is arranged between the layer of anisotropic electrical conductors and the upper polariser, advantageously in contact with said layer of anisotropic electrical conductors. A fine layer of cellular adhesion molecules (typically poly-L-lysine) or another fine layer of an insulator which attenuates the electrical field very little can also be placed.

Operation

Under the action of an electrical field, the liquid crystals are subjected to force torque and are oriented according to the lines of this field.

Depending on their configuration, the liquid crystals transmit the incident beam more or less intensely. They function a little like an optical diaphragm, controlled by the intensity of an electrical field which is applied to them.

Because of this characteristic, the invention functions as a transducer which transforms the electrical activity of a sample, in this case an array of at least one neurone, into an optical signal captured on an optical sensor.

Figure 1A:
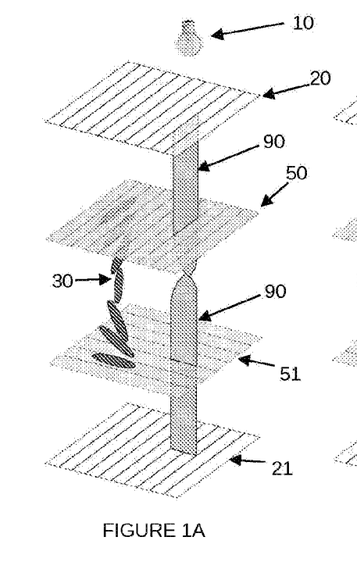
FIG. 1A illustrates an embodiment of a part of the device according to the invention wherein no external voltage is applied to the liquid crystals.
Figure 1B:
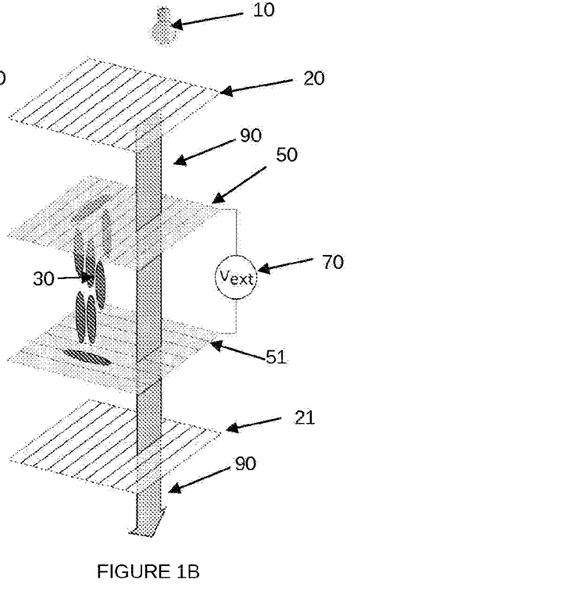
FIG. 1B illustrates the embodiment of the FIG. 1A wherein external voltage is applied to the liquid crystals.

As illustrated in FIGS. 1A and 1B, from one edge to the other of the liquid crystal layer, torsion stress is exerted on the twisted nematic liquid crystal at rest. The light of the incident beam is transmitted from one alignment layer to the other, its polarisation direction turning at the same time as the nematic (helical configuration).

In the "transmission" embodiment, at rest, because of their TN configuration, the polarisation of the incident beam at output of the liquid crystals is perpendicular to that at output of the upper polariser. And since the polarisers are parallel, the axis of polarisation of the incident beam at output of the liquid crystals is perpendicular to the axis of polarisation of the lower polariser, therefore the incident beam is stopped in transmission by the lower polariser: the incident beam does not reach the optical sensor and no electrical signal is generated by the latter; this produces a signal according to one of the two contrasts.

As is known, when external voltage Vext is applied to them, a field is created between the electrodes and the liquid crystals subjected to these field lines are aligned with the latter.

In this way, in the "transmission" embodiment, when external voltage Vext is applied to them, the incident beam can pass through the liquid crystals and the lower polariser to reach the optical sensor which generates an electrical signal.

In the event where the optical sensor is a pixel matrix, a calibration step is advantageously provided in which the optical response of the optical sensor is recorded in a memory when external voltage Vext is applied to the liquid crystals, the incident beam covering all or part of said optical sensor.

A first initial image, called white image or black image can be recorded depending on the first or second selected contrast, corresponding to the optical response of the optical sensor when external voltage Vext is applied between said electrodes, in the absence of a sample and preferably in the presence of the sample base, for example a micro-fluidic cell.

A second initial image, called inactive initial image, corresponding to the optical response of the optical sensor can be recorded when external voltage Vext is applied between said electrodes, in the presence of an inactive sample.

When a neuron is inactive, it generates no electrical signal, but when a neuron is active, it generates an electrical signal whereof the amplitude is around maximal 100 mV, especially in the region of the cellular body.

In fact, all neuronal cells present rest which corresponds to a load balance between their intra- and extracellular medium on either side of the plasmic membrane. The neurons within a network communicate with each other by disseminating information in the form of action potentials. Action potential is generated by a flow of charges through the membranal ionic channels causing local depolarisation of the membrane, or imbalance of these charges, which spreads gradually.

In both cases (active or inactive) the membrane can be represented by a capacity Cm in parallel with a resistor Rm, the two armatures of the condenser representing the intra- and extracellular media and the resistor modelling the ion flow through the ionic channels.

The membrane potential of activated neurons can be represented by a source of voltage Vn in series with its resistor Rn, the whole in turn being in parallel with the preceding circuit RC.

In the case of a neuron through which action potential passes, the difference in membrane potential reaches an amplitude of 100 mV, going from a value of −30 mV corresponding to the rest potential, to +70 mV, this which is shown in the circuit by attributing a value of 100 mV to Vn, corresponding to the maximal state of excitation of the neurone.

Inversely when the neuron is at rest (inactive), the membrane potential remains constant; this is associated with the low state, by fixing Vn=0 V.

In the case of in vitro culture, the neurons are in contact with the rest of the device via a culture chamber, where they are bathed in their medium (Neurobasal (registered trademark), an electrolytic solution of conductivity s~1 S·m$^{-1}$). The distance between the upper electrode and the neuron is represented by an advantageously constant resistor Re but can also be variable according to the geometry of the system.

In an embodiment, the culture well, that is, the sample, for example in PDMS, containing the cells is a well of cylindrical form, in this case 5 mm in radius and 0.5 cm in height.

The value of the resistor Re depends on the geometry of the culture well containing the neurons and is given by Re=rho*I/A, where rho is the resistivity of the culture medium used, I is the height of the well, and A its surface. In this case R=5 mm.

The anisotropic conductor is advantageously a regular grid of vertical conductors encapsulated in an isolating matrix. Advantageously, these conductors are nanowires. The behaviour of each nanowire can be described by a resistor $R_{nf}$ depending on its geometry (length l and radius $r_{nf}$) and of the resistivity of the material used.

$$R_{nf}=rho_{nf}*l/(Pi*r_{nr}^2)$$

with $rho_{nf}$ the resistivity of the nanowire.

The number n of nanowires connected to the examined neuron and solicited to transmit locally the signal electrical from this active neuron to the liquid crystal layer is given by:

$$n=(r_n(4-2\sqrt{2})+2e+2\sqrt{2}r_n)/(4r_{nf}+2e)$$

where e is the spacing between the nanowires of the anisotropic material and $r_n$ is the radius of the neurone.

In defining $R_{ac}$ the equivalent resistor of the array of these n nanowires connected in parallel to the examined neurone, there is $R_{ac}=R_{nf}/n$.

At high frequency (typically beyond 10 kHz), a liquid crystal cell in twisted nematic configuration can be modelled by a condenser $C_{lc1}$ in parallel with a resistor Rcl in series with another condenser $C_{lc2}$.

The external electrical field applied to the whole of the device is an alternative power source AC, advantageously delivering a square signal of variable amplitude Vext and frequency F between 0.1 Hz and 100 Ghz, and in this case 100 KHz.

To simplify the equivalent electrical model, all resistors of contacts have been disregarded but can reconsidered in the model if the loss in potential caused is greater than 0.001V.

The voltage seen by the liquid crystal layer is then expressed depending on all these parameters Vcl.

$$V_{cl} = \frac{Z_{cl}(V_{ext} + V_n)(Z_m + R_n) + R_n V_n}{Zcl(Z_m + R_n) + (Z_m + R_n)(R_e + R_{ac}) + Z_m R_n}$$

With $Z_{cl}$ the module of the impedance equivalent to the whole of the liquid crystal layer, such that $$Z_{cl} = \sqrt{\frac{(R_{cl}C_{cl2}^2C_{cl1}\omega^3)-(R_{cl}C_{cl2}\;C_{cl1}\omega^2)^2}{(C_{cl2}^2C_{cl1}^2\omega^4)(R_{cl}^2+1)} + \frac{(R_{cl}^2C_{cl2}^2C_{cl1}\omega^3)^2-(C_{cl2}\;C_{cl1}\omega^2)}{(C_{cl2}^2C_{cl1}^2\omega)(R_{cl}^2+1)}}$$

where $\omega$ is the angular frequency given by $\omega=2\mathrm{PiF}$ (F the frequency); and Zm the impedance equivalent to the association in parallel of Rm and Cm respectively the resistor and the capacity of the membrane of the neuron such that $$Z_m = \sqrt{\frac{R_m^2}{1+(R_mC_m\omega)^2} - \frac{R_m^2 C_m \omega^2}{1+(R_mC_m\omega)^2}}$$

Given the electro-optical curve T=f(V) of the liquid crystal cell used, the intensity of the light transmitted through the whole of the device can be taken out T by way of the optical sensor.

In this case, T=0.8 $V_{cl}$–1.1 between the threshold voltage $V_{th}$ and the saturation voltage $V_{sat}$.

With $T_{black}$ the optical intensity of the system without neuron for applied voltage Vext, the value Vext is preferably selected such that $(T_{on}-T_{off})/T_{black}>S$, With S the sensitivity of the optical sensor;

$T_{on}$ the optical intensity of the system with an active neurone, for applied voltage Vext; and $T_{off}$ the optical intensity of the system with the inactive neurone, for applied voltage Vext.

The electrical signal of an active neuron locally disrupts the electrical field generated between the two electrodes wherein it bathes. The invention detects this local perturbation or modification of electrical field.

Figure 2:
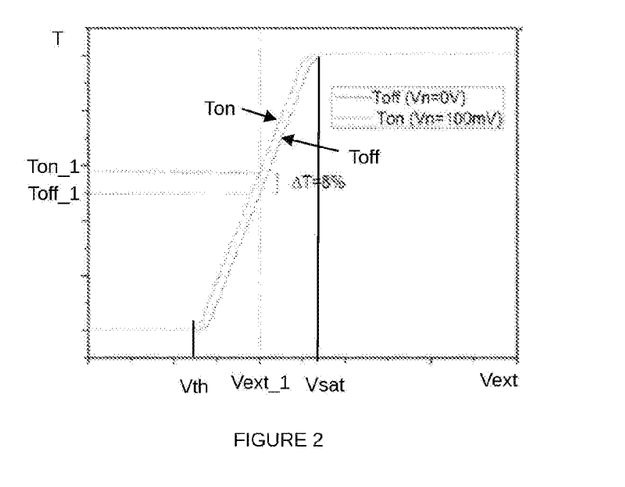
FIG. 2 illustrates the evolution of the optical response of an embodiment of a device according to the invention depending on the value of the external voltage.
Figure 3:
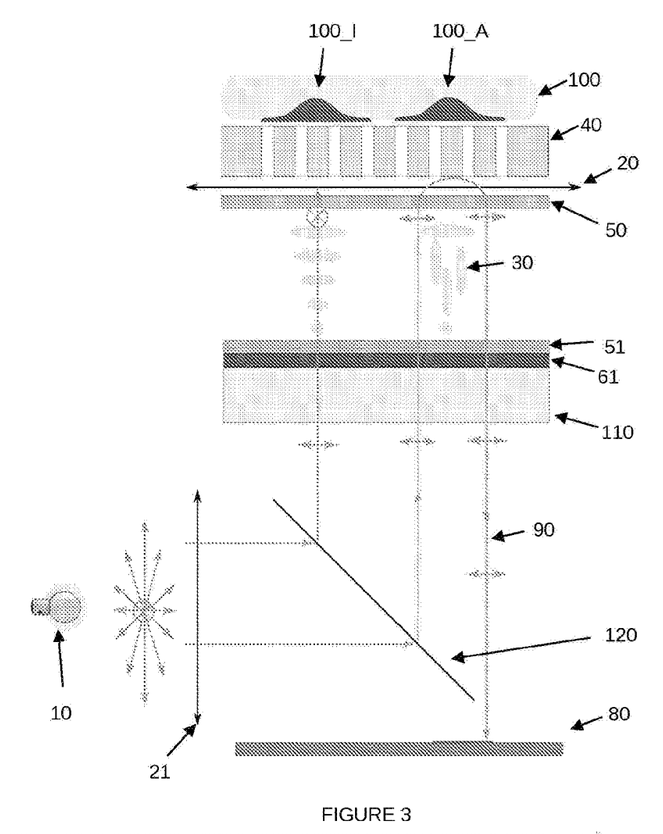
FIG. 3 illustrates an embodiment of the device according to the invention in "reflection" configuration.

In fact, the optical response (transmittance) of liquid crystals at constant lighting depending on the value of the external voltage Vext is illustrated in FIG. 2 according to two curves, a curve Toff for which a neuron is inactive and a curve Ton for which a neuron is active and generates a difference in voltage of 100 mV, which is added to the external field Vext. The form of the optical response, measured by an optical sensor, is overall independent of the frequency of the voltage source for Vext, whether the neuron is active or inactive.

Below a threshold value Vth, or beyond a saturation value Vsat, of the external voltage Vext, the optical transmission T is substantially constant at intensity of the constant source. The values Vth and Vsat depend especially on the type of the liquid crystals; they can be known or determined by measurements. Preferably, the value of the external voltage Vext is therefore regulated such that Vth<Vext<Vsat.

In these conditions, with a value of external voltage Vext=Vext_1, in this case around 2V, a value of optical transmission Toff_1 is observed when the incident beam passes through an inactive neuron 100_1 and a value of optical transmission Ton_1 when the incident beam passes through an active neuron 100_A. According to the experimental conditions used, it was able to be shown that the difference in transmittance between Toff_1 and Ton _1 is 8% with a sensor sensitivity at 0.1%.

This difference in transmittance involves a difference between an image taken by the optical sensor when at least one neuron is active and the inactive initial image. It is possible to imagine the activity of a single neurone, detected by an array of one to a few pixels of the optical sensor.

The correspondence between the position of an active neuron in the sample and the position of the optical receiver or optical receivers of the optical sensor detecting this activity is ensured by the anisotropic character of each anisotropic electrical conductor.

Activation (natural or induced) of an array of at least one neuron locally modifies the value of the electrical field, such that the liquid crystals vertically above said active neuron(s) change configuration and are aligned in the direction of propagation of the incident beam, parallel to the direction of the field lines, and allow transmission of said incident beam through the liquid crystal layer. It should be noted that the liquid crystals which change configuration are "vertically above" said active neuron(s) because the direction of propagation of the incident beam is parallel to the direction of the field lines due to anisotropic electrical conductors, and perpendicular to the alignment layers. If the sole direction of propagation of each anisotropic electrical conductor is not perpendicular to the polarisers, an offset is created, or offset, in the image obtained by the optical sensor, which can be treated by calibration.

Because of the invention, it is possible to simultaneously observe the activity of an individual neuron and the activity of an array of neurons within a network of neurons comprising as many as several million neurons.

Also, the activity of a neuron or an array of neurons can be observed on a large scale, a large field of observation, that is, on the scale of the network of neurons in its ensemble provided the surface of the latter is substantially equal to the surface of the optical sensor, for example a surface of 8 $cm^2$.

An optical block comprising an array of at least one lens can be provided, positioned between the support 110 and the optical sensor 80, such that the surface of said sensor 80 can be smaller than that of the sample.

The surface of a neuron is around 75 $\mu m^2$. With an optical sensor having pixels of around 1.7 $\mu m^2$, there are no optical resolution problems.

Advantageously, the imagery obtained with the invention can be done without a lens.

Also, the invention has no contact with the sample, therefore it is non-destructive of said sample.

The invention is not limited to the embodiments described previously, as, in combination with any one of said embodiments, an assembly of at least one optical waveguide, for example in the form of fibre optics, can also be provided to guide the incident beam between the output of the support 110 and the optical sensor 80, effectively shift said optical sensor.

LEGEND

10 light source
20 upper polariser
21 lower polariser
30 liquid crystals
40 layer of anisotropic electrical conductors
41 individual anisotropic electrical conductor
50 upper alignment layer
51 lower alignment layer
60 upper electrode
61 lower electrode
70 external alternative power source
80 optical sensor
90 incident beam
100 sample 100_A active sample
100_I inactive sample
110 sample base
120 beam separator

The invention claimed is:

1. An electro-optical device for optical detection of an electrical field generated locally by a sample, the device comprising:
  an alternative power source;
  a linear upper polariser and a linear lower polariser;
  a liquid crystal layer, between an upper alignment layer and a lower alignment layer having two alignment directions perpendicular to each other;
  an upper electrode and a lower electrode, connected electrically to the alternative power source, and arranged such that when a difference in voltage (Vext) is applied between said electrodes by said alternative power source, an electrical field is created between the two electrodes, the liquid crystal layer immersing in said electrical field;
  a layer of anisotropic electrical conductors, arranged between the electrodes;
  characterized in that it also comprises:
  said sample immersing in said electrical field created between the two electrodes;
  a light source configured to emit an incident beam in monochromatic light in the direction of an optical sensor, by transmission or reflection of said incident beam through the liquid crystal layer;
  and characterized in that:
  said liquid crystal layer has active variable polarisation, the layer of anisotropic electrical conductors is configured to send said electrical field created between the two electrodes in a single direction of propagation secant to the alignment layers;
said layer of anisotropic electrical conductors being arranged in contact with the upper alignment layer or separated from the latter by the upper polariser.

2. The device according to claim 1, wherein said sample has no contact with said upper electrode and said lower electrode.

3. The device according to claim 1, wherein said upper electrode and said lower electrode are arranged such that when the external voltage (Vext) is applied from said alternative power source: said sample, said layer of anisotropic electrical conductors and said liquid crystal layer are subjected to some at least of the field lines connecting the two electrodes, the electrical field generated locally by said sample disrupting said electrical field created between the two electrodes.

4. The device according to claim 1, wherein said sample comprises a biological neuron network.

5. The device according to claim 1, wherein the upper polariser and the lower polariser are parallel to each other and arranged on either side of the liquid crystal layer.

6. The device according to claim 1, wherein the upper polariser and the lower polariser are perpendicular to each other; the upper polariser being arranged between the upper alignment layer and the layer of anisotropic electrical conductors; the device also comprising a beam separator configured to direct an incident beam coming from a light source and passing through the lower polariser towards the liquid crystal layer by passing successively, from the lower polariser, through the beam separator, then the liquid crystals and, after reflection on the layer of anisotropic electrical conductors, again passes through the liquid crystal layer, optionally the beam separator, and an optical sensor, without passing through the lower polariser.

7. The device according to claim 1, wherein said incident beam travels an optical path, the alignment direction of the first alignment layer being parallel to the polarisation direction of the first polariser met on the optical path of said incident beam.

8. The device according to claim 1, also comprising said optical sensor, configured to detect the optical beam of the light source after transmission or reflection of said optical beam through the liquid crystal layer.

9. The device according to claim 1, wherein the liquid crystals are liquid crystals PCH5 nematic at 37° C. and the external voltage (Vext) is between 2V and 5V.

10. The device according to claim 1, also comprising a memory and a programmable computer comprising program code instructions for:
  recording in said memory:
    an inactive initial image corresponding to the optical response of the liquid crystals when said sample emits no electrical field;
    an active image corresponding to the optical response of the liquid crystals when said sample emits an electrical field locally; and for
    calculating the difference between the inactive initial image and the active image.

* * * * *